United States Patent [19]

Jakobs et al.

[11] 4,248,556
[45] Feb. 3, 1981

[54] METHOD FOR SMOOTHING THE SURFACE OF BAR MATERIAL

[75] Inventors: Willy Jakobs; Heinz Caspelherr, both of Cologne, Fed. Rep. of Germany

[73] Assignee: Klockner-Humboldt-Deutz AG, Fed. Rep. of Germany

[21] Appl. No.: 25,345

[22] Filed: Mar. 30, 1979

[30] Foreign Application Priority Data

Mar. 30, 1978 [DE] Fed. Rep. of Germany ....... 2813646

[51] Int. Cl.³ .............................................. B23C 3/13
[52] U.S. Cl. .................................. 409/131; 51/241 S; 409/173; 409/178; 409/180
[58] Field of Search ............... 409/131, 138, 139, 172, 409/173, 177, 178, 180, 189, 296, 298, 300, 301, 303; 51/241 S, 289 R; 125/14

[56] References Cited

U.S. PATENT DOCUMENTS

| | | | |
|---|---|---|---|
| 2,140,120 | 12/1938 | Tomarin | 409/180 |
| 2,524,332 | 10/1950 | Sichel | 51/241 S |
| 3,138,998 | 6/1964 | Ivan | 409/178 |
| 3,259,021 | 7/1966 | Appleton et al. | 409/178 X |
| 3,421,411 | 1/1969 | Lowry et al. | 409/180 X |
| 3,451,309 | 6/1969 | Millwood et al. | 409/300 |
| 3,699,828 | 10/1972 | Piatek et al. | 409/178 X |

Primary Examiner—Z. R. Bilinsky
Attorney, Agent, or Firm—Hill, Van Santen, Steadman, Chiara & Simpson

[57] ABSTRACT

A method and apparatus for smoothing local unevenness from the surface of bar material, such as anode bars, consisting of clamping the bar rigidly against a supporting frame and moving a smoothing device along the bar, said smoothing device maintained in continued contact with the bar by means of rollers pushing against opposed parallel faces of the bar. The rollers allow the smoothing device to move according to the general contour of the bar, so that only local unevenness is removed, and excessive smoothing due to curvature in the overall bar length is eliminated.

1 Claim, 2 Drawing Figures

METHOD FOR SMOOTHING THE SURFACE OF BAR MATERIAL

BACKGROUND OF THE INVENTION

The present invention relates to a method and apparatus for locally smoothing the surface of bar material, such as anode bars, by clamping the bar and moving a smoothing device along its length.

Smelting electrolysis furnaces utilized in the aluminum industry employ fast-burnt block anodes consisting essentially of carbon. The block anodes are fixed at a lower end thereof by vertically arranged anode bars. The anode bars are releasably connected with a current supply. In order for good electric current transmission from the current supply to the anode bar to be achieved, at least one side of the anode bar must be a very smooth contact surface, which abuts a corresponding surface of the current supply.

During a period of operation of the furnance, it is unavoidable that the contact surface of the anode bar and the corresponding surface of the current supply will become uneven due to pits, ridges, scratches and the like resulting from current arcing and/or abrasion during installation. The result of such uneven contact surfaces is to increase electric arcs to an even greater degree, thereby impairing current transfer and furnace operation, in addition to potential safety hazards.

Surfaces of such anode bars are presently smoothed by removing the bars from the furnace and utilizing a grinding machine having a grinding belt which extends over the entire length of the bar. The grinding belt is pressed against the bar by means of a stationary guide. This method and apparatus is unsatisfactory because it not only smooths local unevenness such as pits and ridges, but also removes a significant portion of the anode bar material due to the fact that the overall length of the bar may exhibit a curvature, which is thus ground by the belt over the entire length of the bar. Such curvature in the length of the bar is not harmful to the current transfer between the current supply and the anode bar, so that the time and expense of removing such a curvature is unnecessary.

An apparatus and method for removing only local unevenness on the surface of anode bars is provided with a smoothing device which follows the general curvature of the bar as a whole. The method is practiced by an apparatus which clamps a bar to be smoothed rigidly against a frame, where a smoothing device guided by rollers abutting opposite parallel sides of the bar is attached thereto. The smoothing device is guided by the rollers along the entire length of the bar so that only local unevenness is removed, while the rollers guide the smoothing device in a path following the curvature of the overall bar length.

Accordingly, it is an object of the present invention to furnish a method and apparatus to locally remove unevenness in bar material which has a specific application to the smoothing of the surface of anode bars.

It is a further object of the present invention to minimize time and expense devoted to the smoothing of such bars by providing a roller guide for a smoothing device which allows the device to move along a surface of the bar in a path corresponding to the general curvature of the overall bar length.

The invention and its further advantages are described in greater detail in the FIGS. and following description.

DESCRIPTION OF THE PREFERRED EMBODIMENTS

Figure 1:
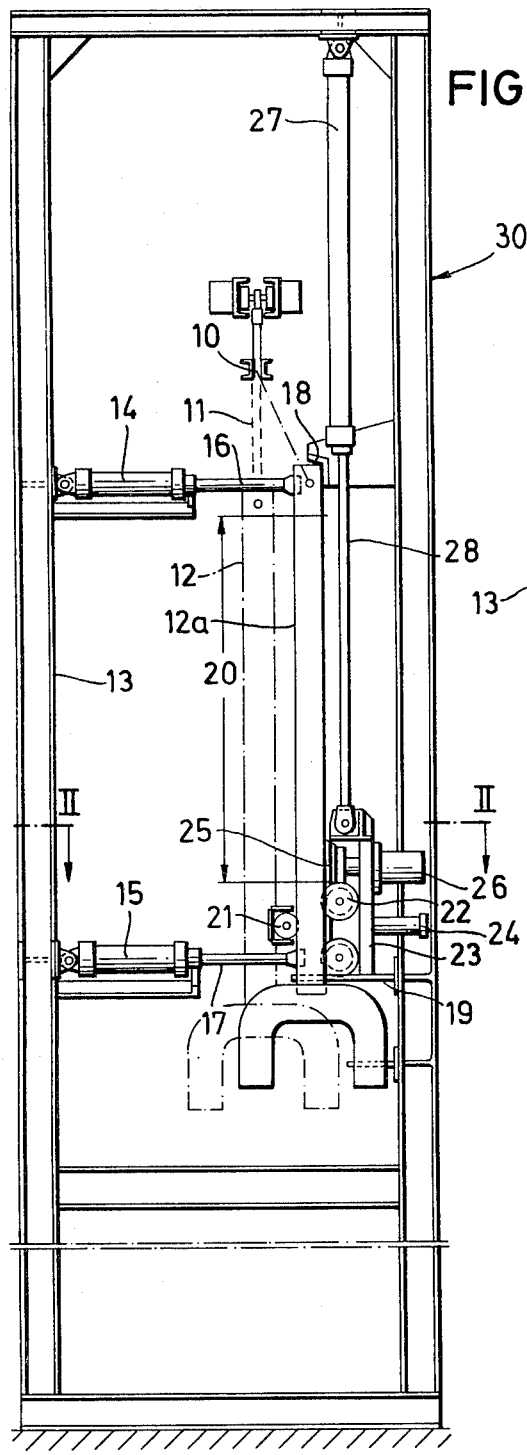
FIG. 1 shows a side view of an apparatus for smoothing the surface of bar material according to the principles of the present invention.

An apparatus for smoothing the surfaces of bar material is shown in FIG. 1 at 30. As will be apparent from the following description, the apparatus 30 can be employed to smooth the surface of any bar shaped material, however, it is particularly suitable for use in smoothing anode bars, which have become pitted, scratched and otherwise uneven after a period of use.

The bar 12 to be smoothed is suspended on a chain 11 and moved into the apparatus 30 by means of a chain conveyor 10. The conveyor 10 moves the bar 12 into a framework 13 on which are supported an upper hydraulic cylinder 14 and a lower hydraulic cylinder 15. The respective piston rods 16 and 17 of the cylinders 14 and 15 are actuated to push the bar 12 against stationary members 18 and 19 of the frame 13. The bar 12 is thus retained in a tightly clamped position shown at 12a.

Figure 2:
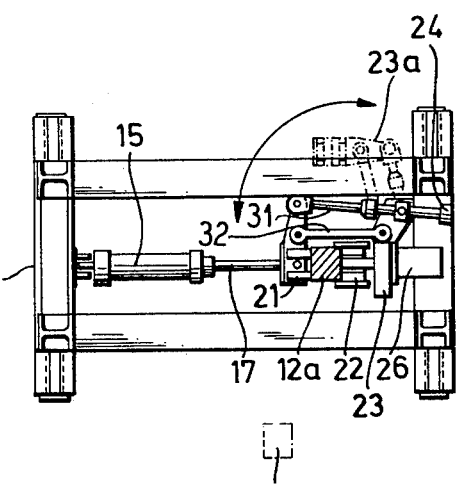
FIG. 2 is a sectional view taken along line II—II of FIG. 1.

Once the bar 12 has been clamped into position 12a, a carriage 23 is moved from a position 23a, as shown in FIG. 2, to a position abutting the bar in the 12a position. The carriage 23 is moved by means of a hydraulic cylinder 24 having a piston 31 which swivelably engages the carriage 23. A connecting rod 32 is similarly connected to the carriage 23.

A first set of rollers 22, which are stationary with respect to the carriage 23, engage one side of the bar in the position 12a. Movement of the carriage into the position shown in FIG. 2 abuts a second set of rollers 21 against an opposite side of the bar in the 12a position. The carriage 23 thus clampingly engages the bar 12a between the rollers 21 and 22.

The carriage 23 also carries a smoothing device 25 which may be a surface milling head or another suitable smoothing means, and has associated therewith a motor 26.

Another hydraulic cylinder 27 is vertically supported in the frame 13 and has a reciprocating piston 28. The piston 28 is attached to the carriage 23 so that action of the piston 28 moves the carriage along the bar 12a in a reciprocating vertical manner. As the smoothing device 25 is moved against the bar 12a by the movement of the carriage 23, the device is guided by the rollers 22 and 21 to assume the general curvature of the bar 12a. The smoothing device 25 will thus mill or grind only local unevenness, and will not attempt to flatten any general overall curvature which the bar may exhibit.

After sufficient moving has been achieved, the carriage 23 is again returned to its 23a position and the pistons 14 and 15 are released to allow the bar 12 to be carried away from the apparatus 30 by the conveyor 10.

Sequencing of the operation of the various hydraulic cylinders and the operation of the smoothing device 25 is accomplished by conventional controls means not shown.

It will be apparent that if the bar 12 should require smoothing on opposing parallel sides, a second smoothing device 25 could be mounted on the carriage 23 to simultaneously smooth both sides. Other modifications and changes may be suggested by those skilled in the art, however, it is the intention of the inventors to embody within the scope of the patent warranted hereon all such changes and modifications as reasonably and properly come within the scope of their contribution to the art.

We claim as our invention:

1. A method for smoothing bar material comprising the steps of:

suspending a bar to be smoothed from a moving conveyor;

moving said bar into proximity with stationary support members;

clamping said bar against said stationary support members;

simultaneously engaging a first surface of said bar with a first pair of rollers;

moving a second pair of rollers into engagement with a second opposite side of said bar;

moving a smoothing device connected to said rollers along a length of said bar;

guiding said smoothing device by means of said rollers to direct said smoothing device along a path following a general curvature of said bar;

moving said second pair of rollers out of engagement with said bar;

releasing said bar from stationary support members; and continuing movement of said bar along said conveyor.

* * * * *